United States Patent [19]
Chow

[11] Patent Number: 5,552,059
[45] Date of Patent: Sep. 3, 1996

[54] PROCESS TO DECONTAMINATE SOIL CONTAINING CHLOROPHENOLS

[75] Inventor: Suezone Chow, Richmond, Canada

[73] Assignee: Canadian Forest Products Ltd., Vancouver, Canada

[21] Appl. No.: 404,684

[22] Filed: Mar. 15, 1995

[51] Int. Cl.$^6$ .................................................. C02F 1/78
[52] U.S. Cl. .................. 210/747; 210/760; 210/908; 210/909; 405/263; 405/128
[58] Field of Search ................... 210/760, 908, 210/909, 747; 405/263, 128

[56] References Cited

U.S. PATENT DOCUMENTS

| | | | |
|---|---|---|---|
| 2,703,312 | 3/1955 | Hann et al. | 210/760 |
| 4,167,973 | 9/1979 | Forte et al. | |
| 4,793,931 | 12/1988 | Stevens et al. | |
| 4,915,842 | 4/1990 | Kearney et al. | 210/760 |
| 4,978,508 | 12/1990 | Hansen et al. | 422/186.08 |
| 5,073,273 | 12/1991 | Gupta et al. | 210/760 |
| 5,134,078 | 7/1992 | Sieksmeyer et al. | |
| 5,205,927 | 4/1993 | Wickramanayake | 210/760 |
| 5,246,309 | 9/1993 | Hobby. | |
| 5,259,962 | 11/1993 | Later. | |
| 5,269,943 | 12/1993 | Wickramanayake | 210/760 |
| 5,332,563 | 7/1994 | Chang. | |

FOREIGN PATENT DOCUMENTS

| | | | |
|---|---|---|---|
| 55088 | 4/1983 | Japan | 210/760 |
| 104693 | 6/1983 | Japan | 210/760 |
| 83000 | 5/1984 | Japan | 210/760 |
| 532575 | 12/1976 | U.S.S.R. | |

Primary Examiner—Neil McCarthy
Attorney, Agent, or Firm—Townsend and Townsend and Crew LLP

[57] ABSTRACT

A process to decontaminate soil containing a chlorinated phenol compound. Water is added to the soil to produce a solution of the chlorinated phenol compound containing at most about 2% by weight of the compound. Ozone is then passed through the solution to decompose the chlorinated phenol compound. The invention is of particular application in decontaminating soil containing chlorophenols, dibenzo-p-dioxins and chlorinated dibenzofurans.

11 Claims, 4 Drawing Sheets

PROCESS TO DECONTAMINATE SOIL CONTAINING CHLOROPHENOLS

FIELD OF THE INVENTION

This invention relates to a process to decontaminate soil containing chlorophenols.

DESCRIPTION OF THE PRIOR ART

In the processing of biological materials such as wood, leather or agriculture products, there is a need for fungicides or insecticides to protect products from decay and insect attack. In the past decades chlorophenols, which are the products of reaction of chlorine and phenol, were proven to be outstanding chemicals for achieving these objectives.

However, in recent years, it was found that chlorophenols are toxic to fish and carcinogenic to humans because of by-products of manufacturing such as polychlorinated dibenzo-p-dioxins (PCDD) and polychlorinated dibenzofuran (PCFD). The use of chlorophenols was banned in most industrial countries. In the wood industry, action has been taken to reduce the dependency on pesticides and fungicides and replace them with extensive kiln drying of lumber. However, the wood industry has used massive amounts of chlorophenols for lumber treatment. Chlorophenols have contaminated mill sites and transport loading areas. The contamination ranges from a few inches below the surface to some depth, even to the water table. The clean up of the contaminated sites will be costly and, above all, there is a need for an effective method to eliminate chlorophenols.

Microbiological decontamination of the sites by enzyme hydrolysis has been applied with some success. However, the very specific condition needed for micro-organisms cannot be used in practical applications without further study.

Ozone has long been recognized as a powerful oxidant for organic compounds and has been used in water purification since the early 1900's - see Ozone, Horvath et al., 1985. U.S. Pat. Nos. 5,259,962 to Later and 4,793,931 to Brown teach the combination of hydrogen peroxide, ozone and ultraviolet light for photo-oxidation of soil.

For treating soil under ground, U.S. Pat. No. 4,167,973 to Forte describes a device for delivering water and oxidizing chemicals or ozone gas mixtures underground through a well and then withdrawing the contaminated water to the surface for treatment. It is a mechanical design to facilitate ozone accessibility but does not address the specific efficiency of chemical reactions and decontamination. Similar methods for withdrawing underground contaminated water and volatile gas to above ground for treatments are shown in U.S. Pat. Nos. 5,246,309 to Hobby and 5,134,078 to Sicksmeyer et al. There is no mention of ozone in these patents.

U.S. Pat. No. 5,269,943 to Wickramanayake describes a method for treating soil contamination in which an ozone containing gas is treated with acid to increase the stability of the ozone in the soil environment. This ozone-gas stream is very acidic with a pH of 1 or less.

From chemical oxidation potential and accessibility points of view, ozone is a good candidate for decontamination of organic compounds. However, being a gas, its stability in admixture with solvents and its wettability (a prerequisite for chemical reaction with organic compounds) are critically important. Unfortunately, conditions which favour ozone's stability and solubility are not necessarily favourable for the solubility of organic compounds. Thus, effective ozone decontamination of organic compound in any environment must take into consideration the stability and reactivity of ozone gas, solvents and chemical compounds. That is, the application of ozone gas to decontamination is highly sensitive to reaction conditions of the environment, such as in the soil.

It is well known that the solubility of chlorophenols (PCP) is inversely proportional to the degree of substitution. The PCP which was used extensively in the industry has the highest degree of substitution and is only slightly soluble in water at neutral pH. When the sodium salt of PCP (NaPCP) was introduced, the industrial application expanded.

NaPCP is very soluble in water; about 33% w/w at 25° C. In the wood industry, the NaPCP was used as an anti-microbial or preservative for lumber treatment. NaPCP contains about 3 to 18% of sodium tetrachlorophenates (NATCP) and trace amounts of mono-, di-, and tertiary-substituted phenates. The concentration of NaPCP solution delivered to lumber mills for sapstain inhibitors was up to 24.2% w/w in water solution. The end use solution of the NaPCP generally had a pH of about 12.

In the circumstances, prior art cleaning methods have proved ineffective or of limited application and the present invention therefore seeks to provide a process to decontaminate soil containing chlorophenols. More particularly, the present invention is a process to decontaminate soil containing chlorophenols that comprises adding water to the soil to produce a chlorophenol solution containing at most about 2% by weight of chlorophenol and passing ozone through said solution to decompose said chlorophenol.

The solution in which the reaction takes place is alkaline, a preferred pH is about 12. This pH may be achieved by adding a base, for example sodium hydroxide, sodium carbonate or sodium borate to the water. Trace amounts of base may be added to the water as it is added to the soil. Ozone may be added to the soil in solution, usually aqueous solution, and the solution may be rendered alkaline by the addition of a base.

In an alternative embodiment, water is added to the soil, then extracted from the soil, made alkaline and contacted with the ozone.

Residual, non-reactive chlorophenate can be adsorbed readily with charcoal or activated carbon.

The invention is illustrated in the following examples. The drawings referred to these examples are as follows.

EXPERIMENTAL RESULTS

Example 1: This study was designed to demonstrate the efficacy of ozone degradation of pentachlorophenols (PCP) and tetrachlorophenols (TCP).

Technical grade PCP, which contains about 15% of TCP, was used for this experiment. PCP was dissolved in 0.5 M sodium hydroxide solution to yield PCP concentrations of 0, 2, 3 and 6%. A 350 ml solution of each PCP concentration was prepared. This solution was contained in a glass assembly equipped with a fritted glass end which was attached to a Erlenmeyer flask (500 ml). Ozone gas was bubbled through the stirred reaction at a concentration of 140 mg/l and a flow rate of approximately 0.25 l/minute. This was done for 30 minutes for each sample. A PCI Model-2 generator was used for generating the ozone.

Figure 1:
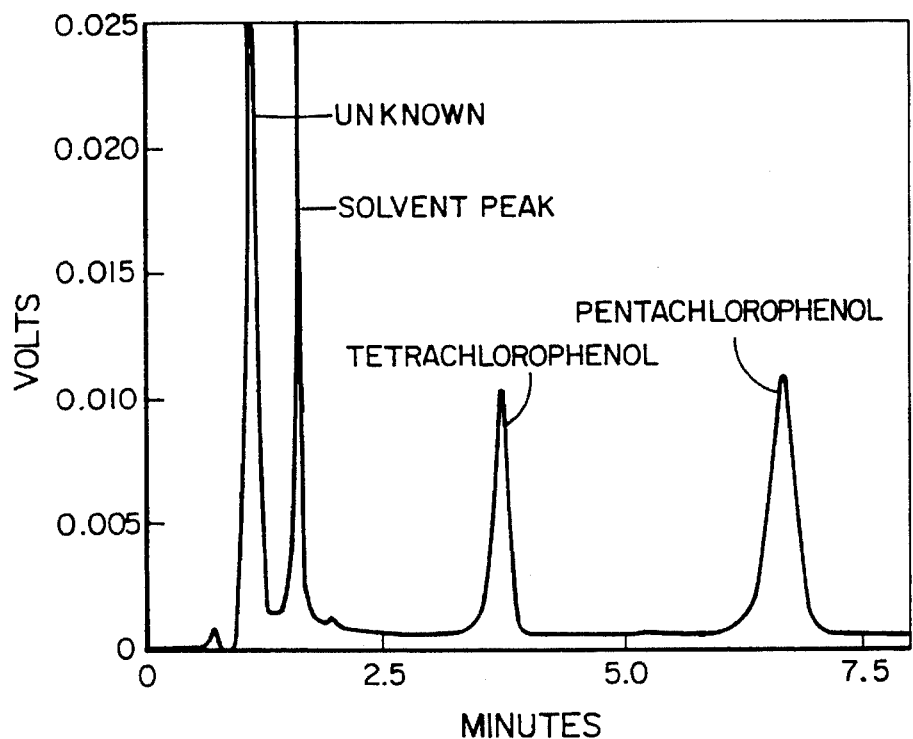
FIG. 1 is a graph showing a high performance liquid chromatograph (HPLC) of penta-chlorophenols (PCP) and tetra-chlorophenols (TCP)

After the initiation of the ozone flow, 5 ml aliquots were withdrawn at 2–3 minutes interval to 5 minutes of reaction time and then one sample each was taken at 5 minutes interval to 25 minutes of total reaction time. The samples were analyzed by High Performance Liquid Chromatogram (HPLC) and the results are shown in FIG. 1.

Figure 2:
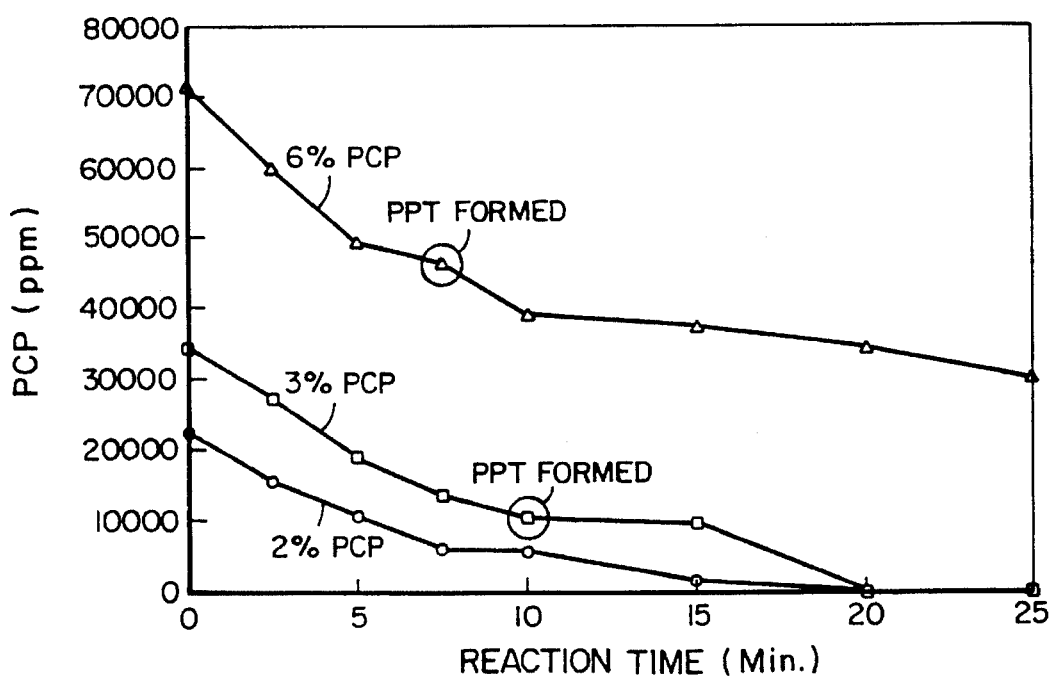
FIG. 2 is a graph showing the rate of change of PCP concentration with ozone treatment.

As shown in FIG. 2, treatment with ozone caused the PCP concentration to decrease rapidly with time. At low PCP concentration (2%), the reaction proceeded very smoothly. The light yellow colour was maintained through out the whole process. At higher PCP concentration (above 3%), the reaction was very violent from the introduction of ozone. The colour of the solution changed from light yellow to dark brown within 2 to 3 minutes of reaction and then showed precipitation of solid from the solution. The precipitation times, as marked in FIG. 2, were about 10 minutes and 8 minutes respectively for 3% and 6% PCP solution. For the 3% PCP sample, the precipitate was pink-red in colour while the precipitate for 6% PCP solution gave in addition to the pink colour, an oily polymer-like substance.

In conclusion, the concentration of more than 2% PCP solution is considered not-suitable for the ozone treatment.

Figure 3:
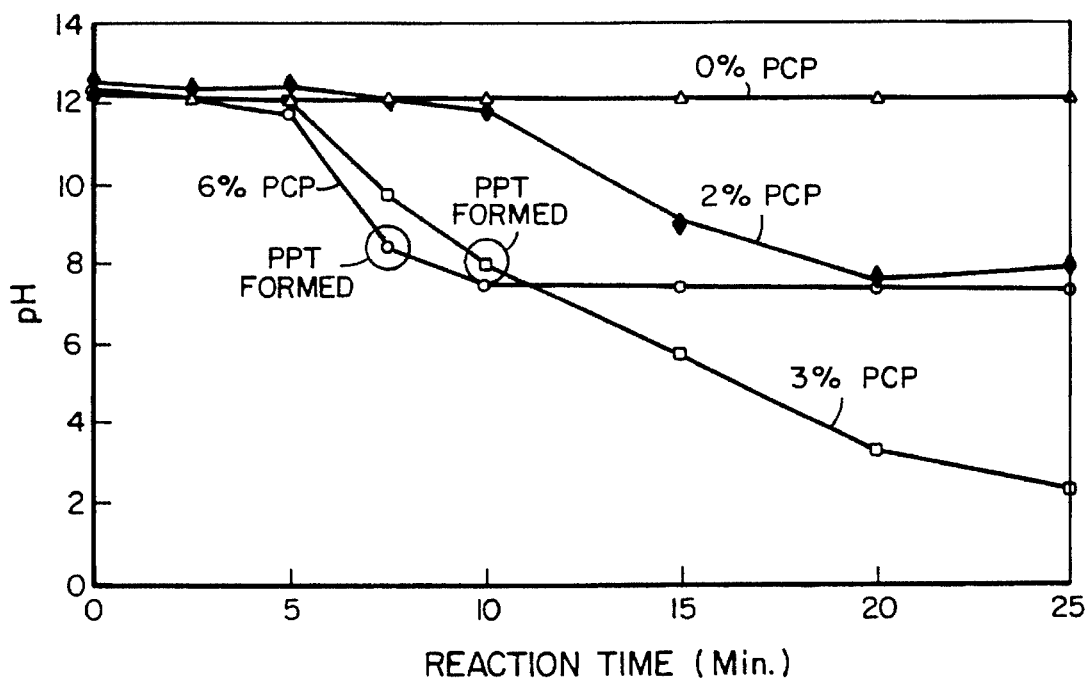
FIG. 3 is a graph showing the rate of change of pH of PCP solutions with ozone treatment.

FIG. 3 shows the acidity change of the treated solutions. The 0% (no PCP but just 0.5 M NaOH water solution) gave practically no change of the pH (12.2) from 0 to 25 minutes reaction time. The 3% solution showed no change of pH for 5 minutes of reaction time (pH 12.2). The pH then dropped to 9.5 at 7–8 minutes reaction time. The pH continued to decrease as the reaction proceeded. At 25 minutes, the pH was about 2.5.

The drastic drop of pH has to be interpreted as due to the reaction products of ozone and the PCP acidifying the solution. The acidic compounds from the reaction could be hydrochloric and/or organic acids.

The 6% PCP solution showed slight decrease of pH below 12 at 5 minutes of reaction with ozone. At 8 minutes reaction time, precipitation and oily substance were observed (pH 8). From 10 to 25 minutes, the pH maintained relatively constant at 7.5 to 7.8.

By comparison of FIG. 1 and FIG. 2, it is clear that the initial reaction of PCP and ozone was very rapid for 5 minutes. The rates of PCP destruction were about 2,200 ppm/min., 3,000 ppm/min. and 4,000 ppm/min. for the original PCP concentration of 2, 3 and 6% respectively. The higher the original concentration the greater is the rate of reaction. This explains the reason for the violent reaction observed for the 6% solution. The pH of the solutions, however, were not greatly different within the first 5 minutes reaction time. This could be due to the buffering by excess NaOH in the solution.

It is worth noting that the reaction of the 6% PCP solution after 8 minutes was almost constant with the pH at about 7.5. The rate of reaction for the same period was about 300 ppm/min. which is much smaller than 4,000 ppm/min. for the first 5 minutes of reaction. This suggests that the formation of oily substance (possible polymerization of the compounds) and the precipitation almost stopped the further reaction of ozone and PCP.

The above evidence demonstrates that ozone can be an effective agent for decomposition of PCP, but its efficiency is very much dependent on PCP concentration.

The experimental results indicate that Wickramanayake's method of stabilization of ozone with strong acid (pH of 1 or less) hinders the reaction of ozone with NaPCP. The addition of strong acid to an ozone stream will precipitate the chlorolophenate from the solution when the two are mixed and thus reduce the chance of a decontamination reaction.

Our evidence further showed that, even without the addition of any acid to the NaPCP water solution, the success of the decontamination of NaPCP/aqueous solutions is highly dependent on the concentration of NaPCP in the solution.

At an NaPCP concentration below 2%, the reaction can be carried out smoothly. However, at an NaPCP concentration of 3%, the PCP started to precipitate from the solution after a reaction time of about 10 minutes. The higher the NaPCP concentration, the shorter is the time to precipitation. The measurement of the pH of the solution at different stages of reaction indicates the formation of hydrochloric acid, organic acids and other compounds. These acidic compounds decrease the pH of the PCP solution and thus precipitate the non-reacted PCP. In addition, from the oily substances observed in the precipitate, some degree of polymerization could be postulated. These polymeric compounds and the precipitate of the PCP would form a coating to the surface of soil particles and prevent the reaction with ozone.

Since in the industrial usage of NaPCP the concentration of NaPCP was in the range of 5 to 24%, it would be logical to assume that the NaPCP solution from lumber treatment that escaped to the soil would form a very high concentration of PCP in the surface of soil particles as its dried. A concentration gradient would also be formed with PCP concentration being highest in the outside surface and decreasing toward the centre of these soil particles. The direct application of ozone stream to the high PCP concentrated particle surface will result in the precipitation of untreated PCP and form a polymerized coating which reduces PCP solubility in water for further treatment. Example 1 demonstrates that new approaches, based on chemical and physico-chemical knowledge, must therefore be taken to increase the effectiveness of ozone decontamination of chlorophenols in soil.

Example 2: Analysis of the Example I precipitates and their solubility.

The precipitates from the reaction of the 3% and 6% PCP solutions were collected. The samples were sequentially placed in different concentrations of sodium hydroxide, sodium carbonate and sodium borate for solubility tests. The pH's of the resultant solutions were recorded.

Table 1 shows the solubility and the pH of the tests.

TABLE 1

Solubility of the Precipitates with Alkaline Additions

| % (w/w) NaOH | Solubility | pH |
|---|---|---|
| 0.005 | not soluble | 11.10 |

TABLE 1-continued

| Solubility of the Precipitates with Alkaline Additions | | |
|---|---|---|
| 0.010 | soluble | 11.35 |
| 0.050 | soluble | 11.65 |
| 0.500 | soluble | 11.70 |
| 2.500 | soluble | 11.74 |

| % (w/w) $Na_2CO_3$ | Solubility | pH |
|---|---|---|
| 0.001 | not soluble | 8.66 |
| 0.010 | not soluble | 10.15 |
| 0.050 | not soluble | 10.35 |
| 0.100 | not soluble | 10.23 |
| 0.500 | soluble | 10.70 |
| 1.000 | soluble | 10.74 |

| % (w/w) Borax $Na_2B_4O_7 \cdot 10H_2O$ | Solubility | pH |
|---|---|---|
| 0.001 | not soluble | 8.66 |
| 0.010 | not soluble | 10.15 |
| 0.050 | not soluble | 10.35 |
| 0.100 | not soluble | 10.23 |
| 0.500 | soluble | 10.70 |
| 1.000 | soluble | 10.74 |

The precipitates were found to be soluble in 0.01% NaOH and 0.5% of $Na_2CO_3$ and 0.01 sodium borate.

The pH's of the resultant solutions were 11.35, 10.7 and 9.00 respectively for the sodium hydroxide, sodium carbonate and sodium borate. The better solubility of the precipitate in borax solution at low pH may be due to the formation of a solvated complex.

This example demonstrates that supplementing trace amounts of the alkaline chemicals in water can enhance the solubility of PCP and thus restore the reaction of ozone and PCP.

Further HPLC analysis of the precipitate from the 3% and 6% PCP solutions by dissolving them in 0.5 M NaOH showed that 40 to 60% of the precipitates was unreacted PCP.

Example 3: Factors hindering the reaction of ozone and halogenated compounds.

The drastic drop of pH of PCP solution caused the precipitation in the reactions with ozone. To further explore the causes for the precipitation of PCP, 3 and 6% of phenol in 0.5 M NaOH solutions were prepared. They were subjected to ozone treatment for up to 25 minutes under the identical conditions as the PCP solutions and the concentration of phenol was determined.

The results are shown in Table 2.

TABLE 2

| Reaction of Phenol and Ozone | | | | | | |
|---|---|---|---|---|---|---|
| | Reaction Time (minutes) | | | | | |
| | 0 | 5 | 10 | 15 | 20 | 25 |
| 3% initial sample concentration (ppm) | 31,000 | 28,600 | 26,600 | 24,000 | 19,500 | 18,700 |
| pH | 12.2 | 12.2 | 12.0 | 11.8 | 10.3 | 10.0 |
| 6% initial sample concentration (ppm) | 61,500 | 61,000 | 59,000 | 56,000 | 54,100 | 52,600 |
| pH | 10.0 | 10.0 | 9.9 | 9.8 | 9.6 | 9.5 |

Figure 4:
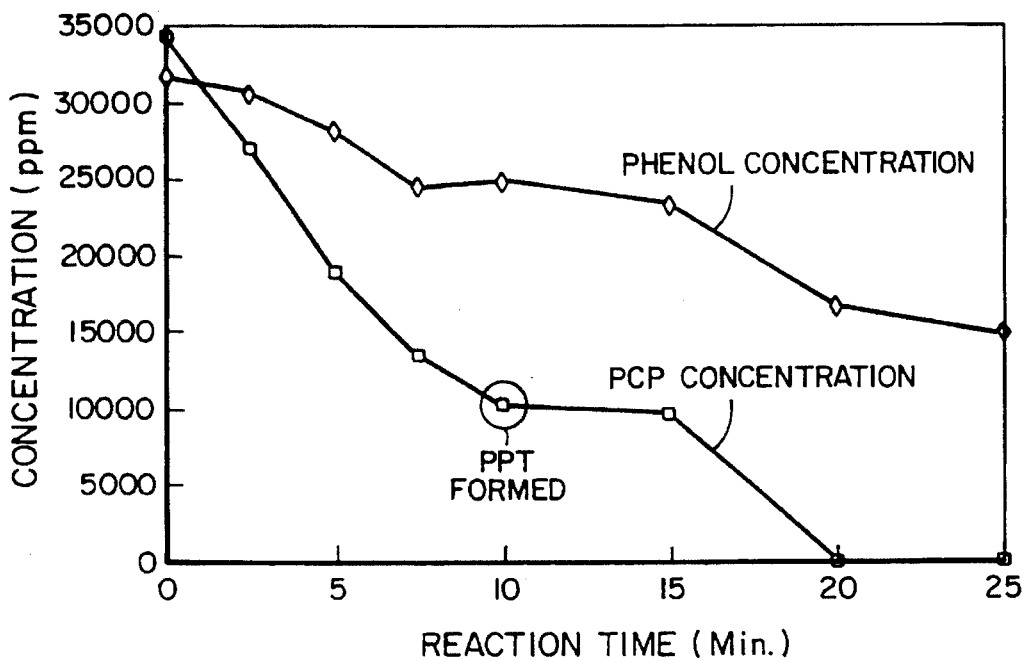
FIG. 4 is a graph comparing the rates of change of concentration of 3% phenol and 3% PCP solutions in reaction with ozone.

As shown in the Table 2 and FIG. 4, the concentration of 3% initial sample decreased at a rate of 500 ppm/min. in the entire reaction time, which is much less than the PCP rate of 2500 ppm/min. within 10 minutes of reaction and before the precipitation. Similarly a small drop in the rate of reaction (350 ppm/min.) for phenol in the 6% solution was shown. In both initial concentration of the phenol solutions, no precipitation was observed during the entire length of time in reaction with ozone.

The above results show that the rates of reaction for halogenated phenols with ozone were 8–10 times greater than that for the unsubstituted parent compound, phenol.

Figure 5:
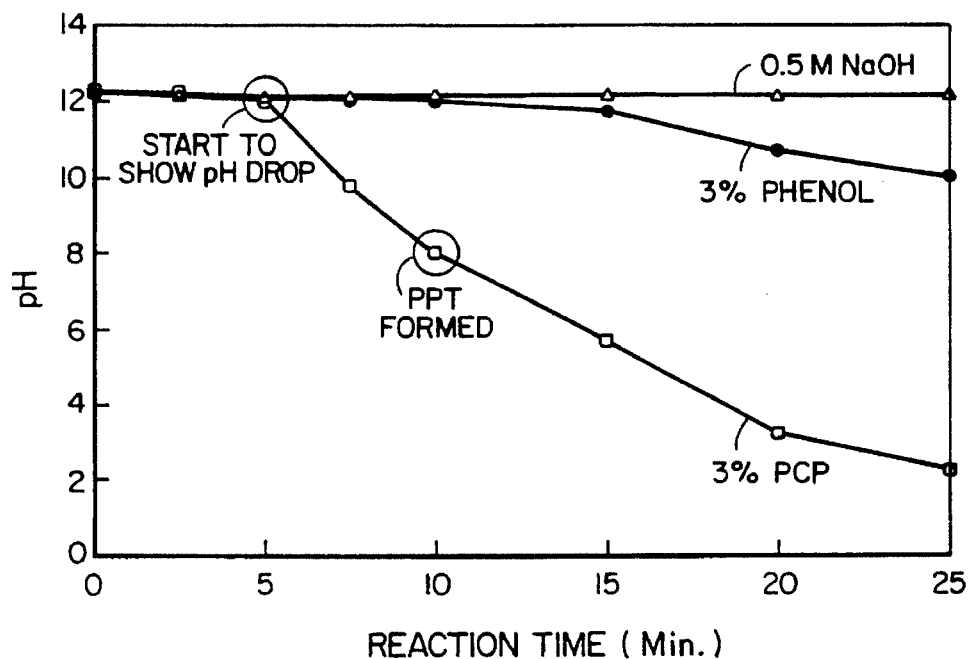
FIG. 5 is a graph comparing the rates of pH change of phenol and PCP reaction media during reaction with ozone.

FIG. 5 shows the change of pH of phenol and PCP solutions. Both the phenol and PCP containing solutions showed pH of 12.2 at the 0 treating time. The phenol solution shows a small drop of pH after 15 minutes of ozone reaction. The pH of the phenol solution was 10.5 at 25 minutes of ozone treatment. Since there is constant pH for 0.5 M NaOH solution for the entire reaction period, the pH drop of the 3% phenol solution can be attributed to the formation of acidic organic compounds. The NaPCP solution showed a drastic drop of pH from 12 at 5 minutes to 2.2 at 25 minutes. This great difference of pH between phenol and PCP after 5 minutes of reaction can reasonably be considered as a result of a large quantity of hydrochloric acid produced during the degradation of PCP.

The formation of hydrochloric acid from PCP degradation with ozone demonstrated that new chemical products resulted from the reaction of halogenated compounds with ozone can hinder and even terminate the desired decontamination reaction.

The present example demonstrated that:

1) The efficacy of ozone decontamination of PCP depends greatly on the PCP concentration in the solution;

2) Halogenated compounds such as chlorophenols, polychlorinated bisphenyls (PCB), 1,1,1,tricholoro- 2,2, Bis(parachlorophenol) ethane (DDT), 2,4-dichlorophenoxyacetic acid (2,4-D), dioxins and furans, etc. will produce strong acids in reaction with ozone and would thus reduce the reaction efficiency or terminate the reaction completely by precipitating or polymerizing the targeted compound for decontamination.

Example 4: Destruction of dioxins and furans.

In the decontamination process, the destruction of toxic chemicals should not produce new toxic chemicals in its process. This is especially critical for the decontamination of chlorophenols since it is well known that dioxins and furans are by-products of PCP manufacturing. These two groups of derivatives are considered to be carcinogenic to humans. The basic structure of dioxins and furans are

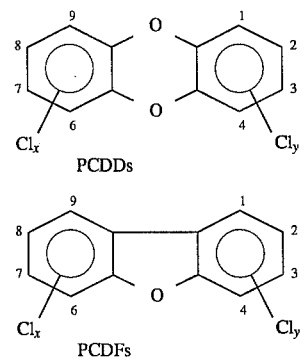

In order to examine if there are new species of chemicals produced and whether the amount of dioxin and furan compounds increased, 0.5% of NaPCP was prepared and subjected to ozone treatment. The samples were taken 5 to 10 minutes intervals from the beginning of the reaction. These samples were then withdrawn at 20 minutes interval to 180 minutes. The PCP content as well as any new chemical species were determined by HPLC instrument.

Figure 6:
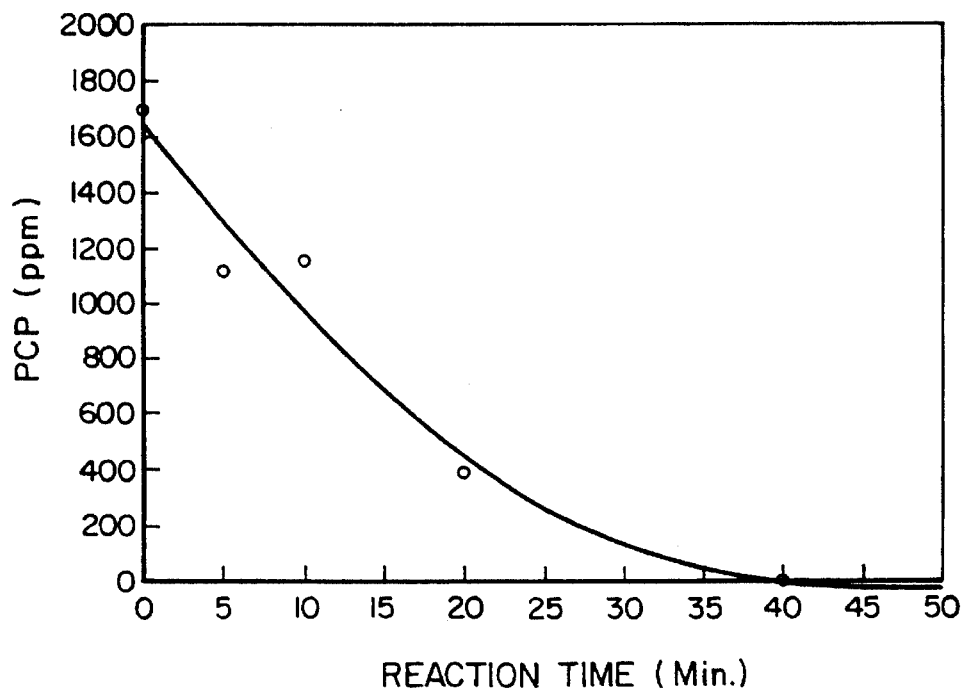
FIG. 6 is a graph showing the degradation rate of PCP with ozone reaction.
Figure 7:
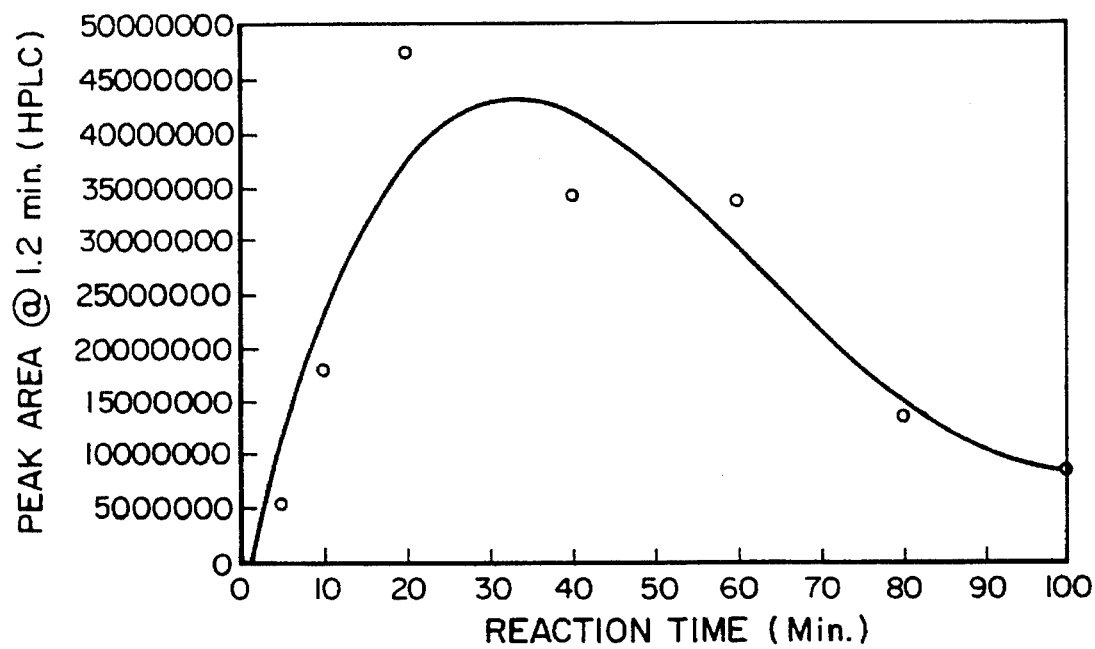
FIG. 7 is a graph relating the concentration of new products from the degradation of pentachlorophenol with ozone.

As shown in FIG. 6, the rapid decrease of PCP was observed as also demonstrated in other Examples. The PCP was completely destroyed at about 40 minutes of reaction. Accompanying this destruction, new chemical species were observed as shown in HPLC chromatogram (FIG. 7). This new species reached a maximum at 20 minutes and then decreased toward reaction time of 180 minutes. This confirms that the products from the destruction of PCP were further destroyed in the process.

For the determination of dioxins and furans, three 2 liter samples of 0.5% NaPCP were prepared. Two of the samples were subjected to ozone treatment for 40 minutes (maximum peak for the new species from FIG. 7) and 180 minutes. One of them was used as control without ozone treatment. After the treatment, the solutions were sent to an independent laboratory for the analysis by use of high resolution gas chromatograph and mass spectrophotometer.

Figure 8:
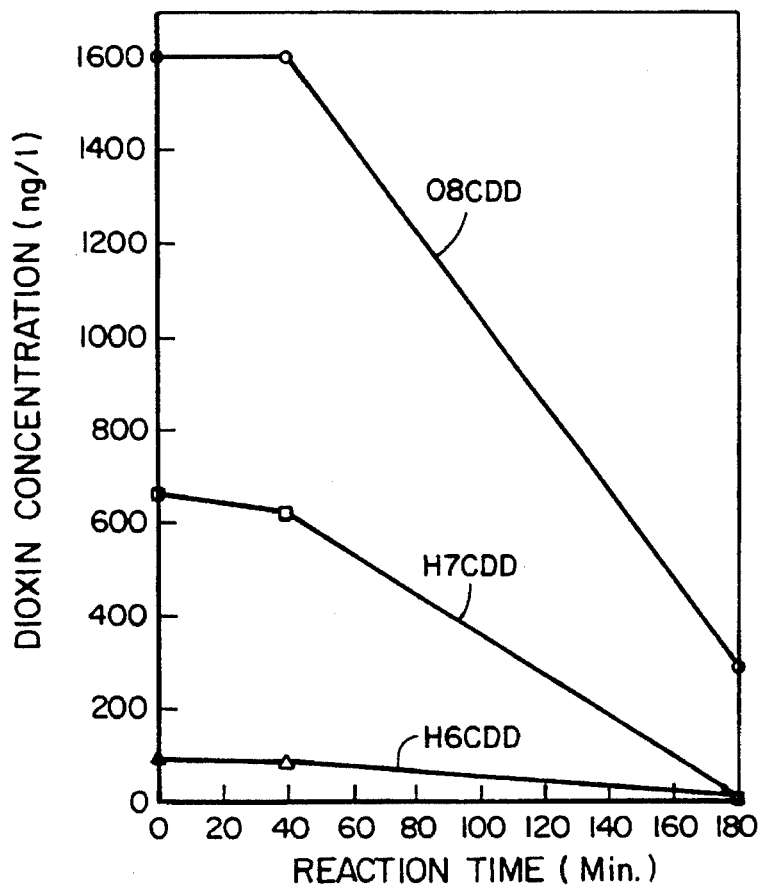
FIG. 8 is a graph showing the rate of destruction of dioxins in PCP solution during ozone treatment.

The results of the analysis are shown in Table 3 and FIG. 8.

TABLE 3

The destruction of dioxins and furans with ozone treatment.

| Concentration: ng/L | Reaction Time (minutes) | | |
|---|---|---|---|
| | 0 | 40 | 180 |
| Dioxins | | | |
| T4CDD - Total | ND | ND | ND |
| 2,3,7,8 | ND | ND | ND |
| P5CDD - Total | ND | ND | ND |
| 1,2,3,7,8 | ND | ND | ND |
| H6CDD - Total | 88 | 83 | 13 |
| 1,2,3,4,7,8 | NDR (1,8) | 1.9 | ND |
| 1,2,3,6,7,8 | 57 | 52 | 9.5 |
| 1,2,3,7,8,9 | 2.0 | 2.8 | ND |
| H7CDD - Total | 660 | 620 | 120 |
| 1,2,3,4,6,7,8 | 600 | 560 | 110 |
| O8CDD - TOTAL | 1600 | 1600 | 290 |
| Furans | | | |
| T4CDF - Total | 1.8 | 1.3 | ND |
| 2,3,7,8 | 0.3 | 0.2 | ND |
| P5CDF - Total | 0.6 | 0.7 | ND |
| 1,2,3,7,8 | ND | ND | ND |
| 2,3,4,7,8 | ND | ND | ND |
| H6CDF - Total | 27 | 27 | 5.1 |
| 1,2,3,4,7,8 | 7.3 | 6.9 | 1.4 |
| 1,2,3,6,7,8 | ND | ND | ND |
| 2,3,4,6,7,8 | ND | ND | ND |
| 1,2,3,7,8,9 | ND | ND | ND |
| H7CDF - Total | 82 | 76 | 14 |
| 1,2,3,4,6,7,8 | 33 | 30 | 6.2 |
| 1,2,3,4,7,8,9 | 1.2 | 1.1 | ND |
| O8CDD - TOTAL | 80 | 73 | 15 |

ND - Not detected
NDR - Peak detected but did not meet quantification criteria
CDD - chlorinated dibenzo-p-dioxins
CDF - chlorinated dibenzofurans
T4 - Tetra-
P5 - Penta-
H6 - Hexa-
H7 - Hepta-
O8 - Octa- In Table 3, the dioxin and furan groups were divided into several chemical groups on the basis of the substitution patterns in the aromatic rings.

The T4CDD, with 4 chlorine substituents (2, 3, 7 and 8) in the dioxin rings was not present in the original PCP. These components are generally considered as the most toxic. In the process of ozone treatment, neither T4D and P5CDD were produced. The T4CDF and P5CDF decreased in the process of ozone reaction and were completely destroyed at 180 minutes of reaction.

The H6CDD, H7CDD and O8CDD showed greater concentrations but were destroyed by ozone in the treatment as shown in FIG. 8. The higher substituted furan groups also showed similar destruction pattern to that of dioxins.

This example demonstrates that, during the ozone reaction with PCP as shown in the condition of present experimental conditions, no new dioxin and furan were produced. The original dioxins and furans in the samples were destroyed with the ozone treatment.

This experimental results should be equally applicable to the commercial products of PCB, DDT, 2,4 D halogenated compounds.

Example 5: Ozone treatment of chlorophenol contaminated soils.

The soils used for this experiment were obtained from a sawmill which was previously known to be contaminated with different degrees of PCP concentration. Six samples of the soils (including gravel) were taken to the laboratory for analysis.

Each solid sample was further divided into two portions; one for the analysis of the total PCP in the soil without the ozone treatment. The other was treated with ozone for the examination of decontamination efficiency.

The control samples (30 grams each) were weighed into a 500 ml Erlenmeyer flask fitted with a ground glass joint. Deionized water (350 ml) with 0.5 M NaOH was added. A stir bar was added for agitation. Three hours later, the water solution was withdrawn for the analysis of the PCP concentration by use of a HPLC method. The concentration of chlorophenols were determined for TCP and PCP separately. The concentration was calculated and expressed as mg/kg of dry soil used.

The other matched samples of the control were used for the ozone treatment. The soil sample was contained in a Erlenmeyer flask. A glass assembly equipped with a fritted glass end was attached to the flask. Ozone gas was bubbled through the stirring reaction at a concentration of 140 mg/l and a flow rate of approximately 0.25 l/min. This was done for 30 minutes for each sample.

The water solution was then withdrawn for PCP analysis. The remaining soil was washed by water again and then oven dried at 60° C. Ten gram of the soil sample was then placed in a beaker with 25 ml of 0.5M NaOH for extraction for one hour. The solution was decanted for PCP analysis.

The results of this experiment are shown in Table 4.

TABLE 4

Decontamination of Ozone on Soils from Mill Sites

| Sample # | Control Before | | Ozone Treated | | Residuals* | |
|---|---|---|---|---|---|---|
| | TCP | PCP | TCP | PCP | TCP | PCP |
| 1 | 7.11 | 15.54 | 0.09 | 0.17 | 0.64 | 1.17 |
| 2 | 3.37 | 10.68 | 0.07 | 0.13 | 1.38 | 1.90 |
| 3 | 20.78 | 8.24 | 0.03 | 0.00 | 0.00 | 0.46 |
| 4 | 1.57 | 2.65 | 0.03 | 0.00 | 0.21 | 0.49 |
| 5 | 5.58 | 11.18 | 0.03 | 0.00 | 0.63 | 0.70 |
| 6 | 30.36 | 127.0 | 0.35 | 0.66 | 3.76 | 4.52 |
| Average | 11.46 | 29.22 | 0.10 | 0.16 | 1.10 | 1.54 |

*Residual in soil after ozone treatment in water solution but was extractable with 0.5 m NaOH water solution.

These results demonstrate the actual destruction of PCP in mill site soil by use of ozone in water solution. They also demonstrate the existence of PCP in the soil after ozone treatment which confirmed the discovery of Examples 2 and 3 of the desirability of alkali to further facilitate the ozone reaction.

Example 6: Treatment of PCP solution by charcoal and activated carbon.

In the process of decontamination of PCP, it is anticipated that the complete removal of the chlorophenols, in some case may not be met. A supplemental approach should be available.

In this study, we demonstrated that the partially activated charcoal and completely activated carbon can be used for this purpose.

In the experiment, carbon columns were made in a glass chromatography column with a diameter of 2.1 cm. The column height was 8.5 cm. Polyester fibre was placed above and below the carbon to hold the charcoal and activated carbon in place.

Standard solutions of PCP in 0.5 M NaOH were prepared at low and high concentrations. The PCP concentrations were measured on the samples before being passed through an activated charcoal or carbon column. The analysis of the PCP was done by HPLC.

The results of this experiment are shown in Table 4. Both methods of removing the PCP have been effective. The activated carbon performed better than the charcoal. This is mainly due to the more surface area for absorption in the former than the latter.

TABLE 5

PCP Concentrations (ppm) before and after Charcoal and activated Carbon Treatment

| Sample | Charcoal | | Activated Carbon | |
|---|---|---|---|---|
| | Before | After | Before | After |
| Low | 6.46 | 0.16 | 6.46 | 0.00 |
| High | 84.7 | 31.8 | 143.3 | 0.18 |

We have demonstrated that the charcoal and activated carbon can be independently used for removing the PCP. It can also be a supplement to the ozone degradation process to remove the residual chemicals. The chemicals absorbed in the charcoal and activated carbon can then be returned to the ozone treatment to decontaminate the absorbed residual chemicals.

I claim:

1. A process to decontaminate soil containing a chlorinated phenol compound said process consisting essentially of:

adding water to the soil to produce a chlorinated phenol solution containing at most about 2% by weight of the chlorinated phenol compound and passing ozone through said solution to decompose said chlorinated phenol compound.

2. A process as claimed in claim 1 in which the chlorinated phenol compound is a chlorinated dibenzo-p-dioxin or a chlorinated dibenzofuran.

3. A process as claimed in claim 1 including adding a base to the chlorinated phenol compound solution.

4. A process as claimed in claim 3 in which the base is added in an amount sufficient to adjust the pH to about 12.

5. A process as claimed in claim 3 in which the base is sodium hydroxide, sodium carbonate or sodium borate.

6. A process as claimed in claim 1 in which a base is added to the water added to the soil.

7. A process as claimed in claim 1 in which ozone is added to the soil in solution.

8. A process as claimed in claim 7 in which the solution is aqueous solution.

9. A process as claimed in claim 8 in which the solution is rendered alkaline by the addition of a base.

10. A process as claimed in claim 1 in which, after adding to the soil, the water is extracted from the soil, made alkaline and contacted with said ozone.

11. A process as claimed in claim 1 including an additional step of adsorbing residual, non-reactive chlorinated phenol compound with charcoal or activated carbon.

* * * * *